(12) United States Patent
Chang et al.

(10) Patent No.: US 9,268,825 B2
(45) Date of Patent: Feb. 23, 2016

(54) PRESENTING A COMBINED SEARCH RESULTS SUMMARY IN A GRAPHICAL VIEW

(71) Applicant: International Business Machines Corporation, Armonk, NY (US)

(72) Inventors: Billy W. Chang, Rockville, MD (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 73 days.

(21) Appl. No.: 14/017,154

(22) Filed: Sep. 3, 2013

(65) Prior Publication Data

US 2015/0066905 A1 Mar. 5, 2015

(51) Int. Cl.
*G06F 17/30* (2006.01)

(52) U.S. Cl.
CPC .... *G06F 17/30554* (2013.01); *G06F 17/30011* (2013.01)

(58) Field of Classification Search
USPC .......... 707/600, 608, 687, 705, 790, 813
See application file for complete search history.

(56) References Cited

U.S. PATENT DOCUMENTS

| | | | |
|---|---|---|---|
| 6,687,712 B2 * | 2/2004 | Mito | G06F 17/3089 |
| 7,152,064 B2 | 12/2006 | Bourdoncle et al. | |
| 7,272,597 B2 | 9/2007 | Chowdhury et al. | |
| 7,818,314 B2 | 10/2010 | Chowdhury et al. | |
| 8,326,847 B2 | 12/2012 | Balmin et al. | |
| 8,370,362 B2 | 2/2013 | Szabo | |
| 2008/0010605 A1 * | 1/2008 | Frank | G06F 17/30241 715/765 |
| 2011/0099134 A1 | 4/2011 | Shirwadkar et al. | |
| 2013/0059607 A1 * | 3/2013 | Herz | H04L 67/20 455/456.3 |

OTHER PUBLICATIONS

US Patent Application, dated Jun. 20, 2014, for U.S. Appl. No. 14/310,284, entitled "Presenting a Combined Search Results Summary in a Graphical View", invented by Billy W. Chang et al., Total 26 pages.

Preliminary Amendment, dated Jun. 20, 2014, for U.S. Appl. No. 14/310,284, filed Jun. 20, 2014, entitled "Presenting a Combined Search Results Summary in a Graphical View", invented by Billy W. Chang et al., Total 4 pages.

Nallapati, R. et al., "Extraction of Key Words from News Stories", dated 2004, Center for Intelligent Information Retrieval, Department of Computer Science, Total 6 pages.

(Continued)

*Primary Examiner* — Sana Al Hashemi
(74) *Attorney, Agent, or Firm* — Janaki K. Davda; Konrad, Raynes, Davda and Victor LLP

(57) ABSTRACT

Provided are a computer implemented method, computer program product, and system for presenting a combined search results summary in a graphical view. Selection of two or more search results are received, wherein each of the two or more search results has an associated search result summary, and wherein each associated search result summary includes one or more entries. Relationships between the one or more entries of each associated search result summary and strengths of the relationships are identified. A graphical view is displayed that shows the one or more entries of each associated search result summary, the relationships, and the strengths of those relationships.

12 Claims, 7 Drawing Sheets

(56) References Cited

OTHER PUBLICATIONS

"Mining Model Content for Clustering Models (Analysis Services—Data Mining)", SQL Server 2002, (online) retrieved from the Internet on Aug. 14, 2013, from URL>http.technet.microsoft.com/en-us/library/cc645761.asp . . . Total 6 pages.

"Lab 2: Viewing and Interpreting Analysis Models" Commence Server 2002, (online) retrieved from the Internet on Mar. 18, 2013, from URL>http.msdn.microsoft.com/en-us/library/ee799115(d=printer,v=cs.20).aspx, Total 13 pages.

"Automatic Keyword Extraction Using Domain Knowledge" (online) retrieved from the Internet on Mar. 18, 2013, from URL>http://link.springer.com/chapter/10.1007%2F3-540-44686-9_47, Total 4 pages.

Wikipedia, "Association Rule Learning", (online) retrieved from the Internet on Aug. 14, 2013 at URL>http:www.en.wikipedia.ord/wiki/Association_rule_learning . . . Total 9 pages.

\* cited by examiner

PRESENTING A COMBINED SEARCH RESULTS SUMMARY IN A GRAPHICAL VIEW

FIELD

Embodiments of the invention relate to presenting a combined search results summary in a graphical view.

BACKGROUND

While searching for information, a user enters a search query (formed by keywords) into a search engine, and the search engine returns, typically, multiple search results. In this case, for a single search query, the search engine provides multiple search results. Each of the search results may be presented as a Uniform Resource Locator (URL), and a search summary is provided for each search result (e.g., URL). The search summary for a search result provides some detailed information about the search result.

With a search engine returning multiple search results, the user has to refer to multiple URLs to get the detailed information. For example, if a user is searching for "top news of 2012", the search results may include: one URL showing "Top 10 Stories", and another URL showing "Top 15 News Stories". In this example, some content is common in the search summaries and/or documents associated with the different URLs.

That is, different URLs associated with different documents may have some content in common and some content that is different. As a user opens each URL, some content may be redundant, while some content may be new.

SUMMARY

Provided is a method for presenting a combined search results summary in a graphical view. Selection of two or more search results are received, wherein each of the two or more search results has an associated search result summary, and wherein each associated search result summary includes one or more entries. Relationships between the one or more entries of each associated search result summary and strengths of the relationships are identified. A graphical view is displayed that shows the one or more entries of each associated search result summary, the relationships, and the strengths of those relationships.

Provided is a computer program product for presenting a combined search results summary in a graphical view. The computer program product comprises a computer readable storage medium having program code embodied therewith, the program code executable by at least one processor to perform: receiving selection of two or more search results, wherein each of the two or more search results has an associated search result summary, and wherein each associated search result summary includes one or more entries; identifying relationships between the one or more entries of each associated search result summary and strengths of the relationships; and displaying a graphical view that shows the one or more entries of each associated search result summary, the relationships, and the strengths of those relationships.

Provided is a computer system for presenting a combined search results summary in a graphical view. The computer system comprises one or more processors, one or more computer-readable memories and one or more computer-readable, tangible storage devices and program instructions, stored on at least one of the one or more computer-readable, tangible storage devices for execution by at least one of the one or more processors via at least one of the one or more memories, to perform: receiving selection of two or more search results, wherein each of the two or more search results has an associated search result summary, and wherein each associated search result summary includes one or more entries; identifying relationships between the one or more entries of each associated search result summary and strengths of the relationships; and displaying a graphical view that shows the one or more entries of each associated search result summary, the relationships, and the strengths of those relationships.

BRIEF DESCRIPTION OF THE SEVERAL VIEWS OF THE DRAWINGS

In the drawings, like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
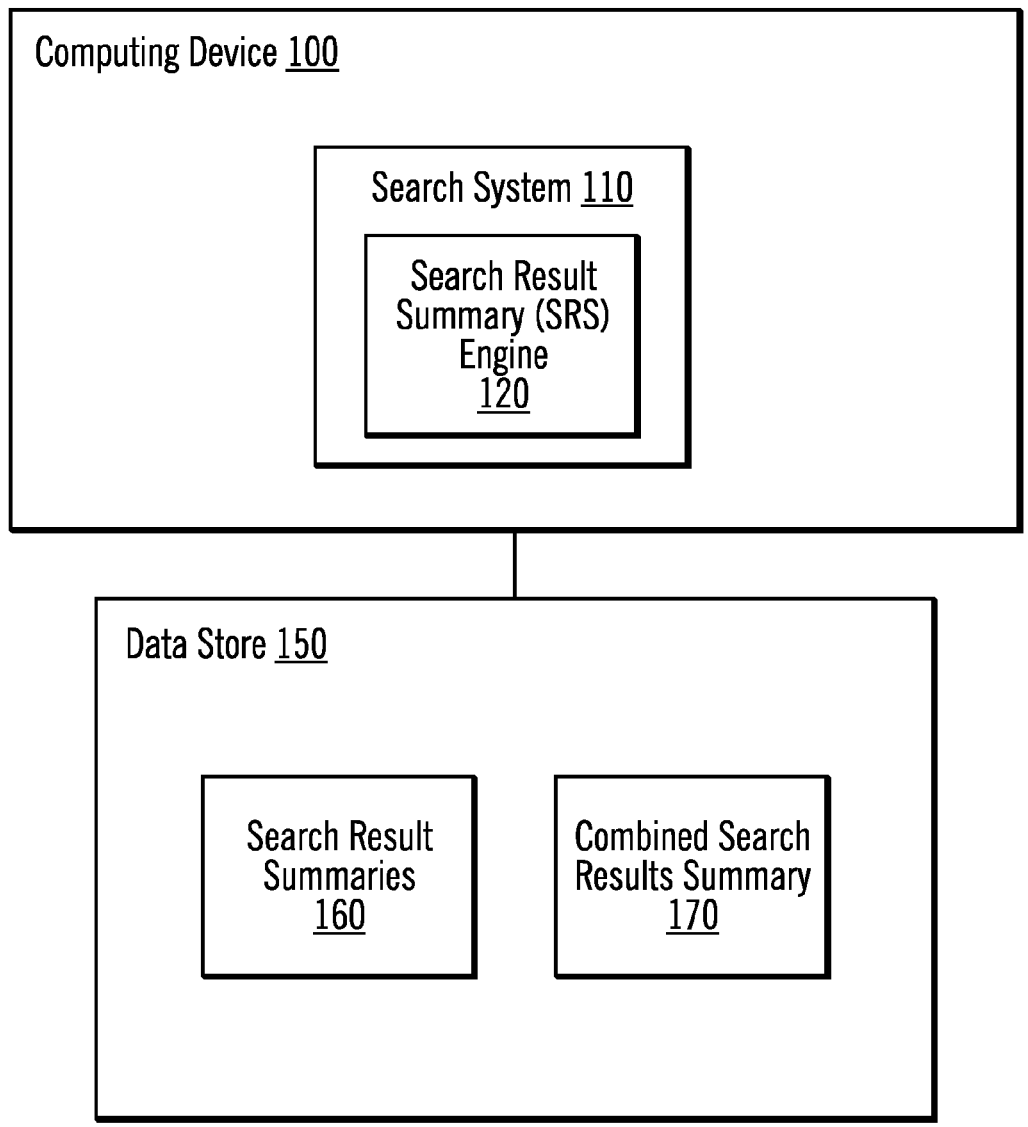
FIG. 1 illustrates, in a block diagram, a computing environment in accordance with certain embodiments.

FIG. 1 illustrates, in a block diagram, a computing environment in accordance with certain embodiments. A computing device 100 includes a search engine 110. In certain embodiments, the search engine 110 includes a Search Result Summary (SRS) engine 120. In certain alternative embodiments, the SRS engine 120 is separate from the search engine 110. For example, the SRS engine 120 may be a browser plug-in.

The computing device 100 is coupled to a data store 150. The data store 150 stores search result summaries 160 and a combined search results summary 170.

In certain embodiments, the SRS engine 120 allows selection of two or more search result summaries 160 and generates a combined search results summary 170 that is displayed in a graphical view in a Graphical User Interface (GUI).

In certain embodiments, there is one search result summary associated with a search result (e.g., a URL), and the SRS engine 120 extracts search result summaries associated with individual URLs.

Figure 2A:
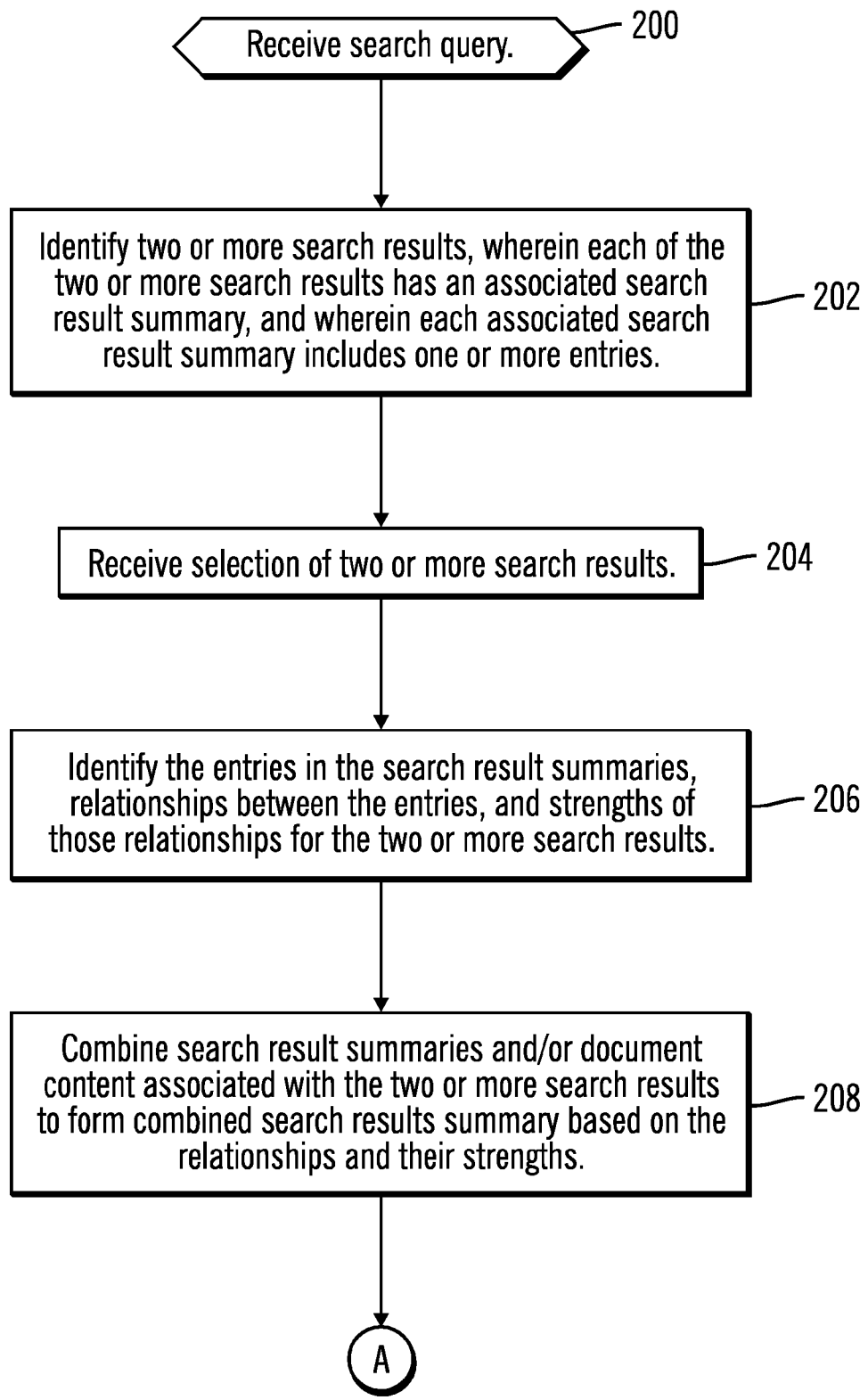
FIGS. 2A and 2B illustrate, in a flow diagram, operations performed in accordance with certain embodiments.
Figure 2B:
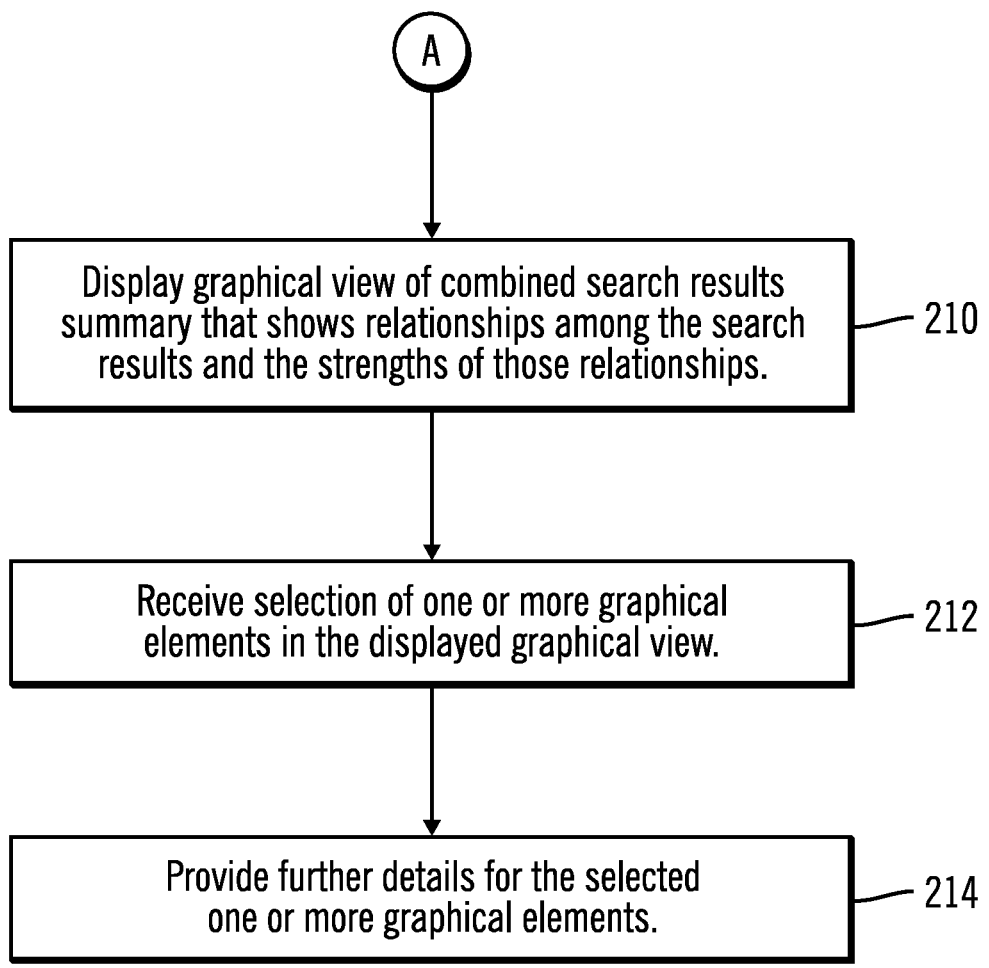

FIGS. 2A and 2B illustrates, in a flow diagram, operations performed in accordance with certain embodiments. Control begins at block 200 with the search engine 110 receiving a search query. In block 202, the search engine 110 identifies two or more search results, wherein each of the two or more search results has an associated search result summary, and wherein each associated search result summary includes one or more entries.

In certain embodiments, once the two or more search results are identified, control goes to the SRS engine 120 from the search engine 110.

In block 204, the SRS engine 120 receives selection of two or more search results. In various embodiments, selection herein refers to selection by a human user, by an application program, by a device, etc. In block 206, the SRS engine 120 identifies entries in the search result summaries, relationships between the entries, and the strengths of those relationships for the two or more search results. In block 208, the SRS engine 120 combines search result summaries and/or document content associated with the two or more search results to form a combined search results summary based on the relationships and their strengths.

In various embodiments, the relationships are defined by keywords, phrases, concepts, distinctions (e.g., keywords that are extracted from the search results and contents and that are different from each other), commonality (e.g., if any context from the search results are common, the commonality is identified based on matching keywords and relationships among them), time, etc. Thus, in various embodiments, the entries may include keywords, phrases, concepts, distinctions, commonality, time, etc. From block 208 (FIG. 2A), processing continues to block 210 (FIG. 2B).

In block 210, the SRS engine 120 displays a graphical view of the combined search results summary that shows relationships among the search results and the strengths of those relationships. The graphical view may be presented in a GUI. In certain embodiments, the graphical view includes a directed graph.

Figure 3:
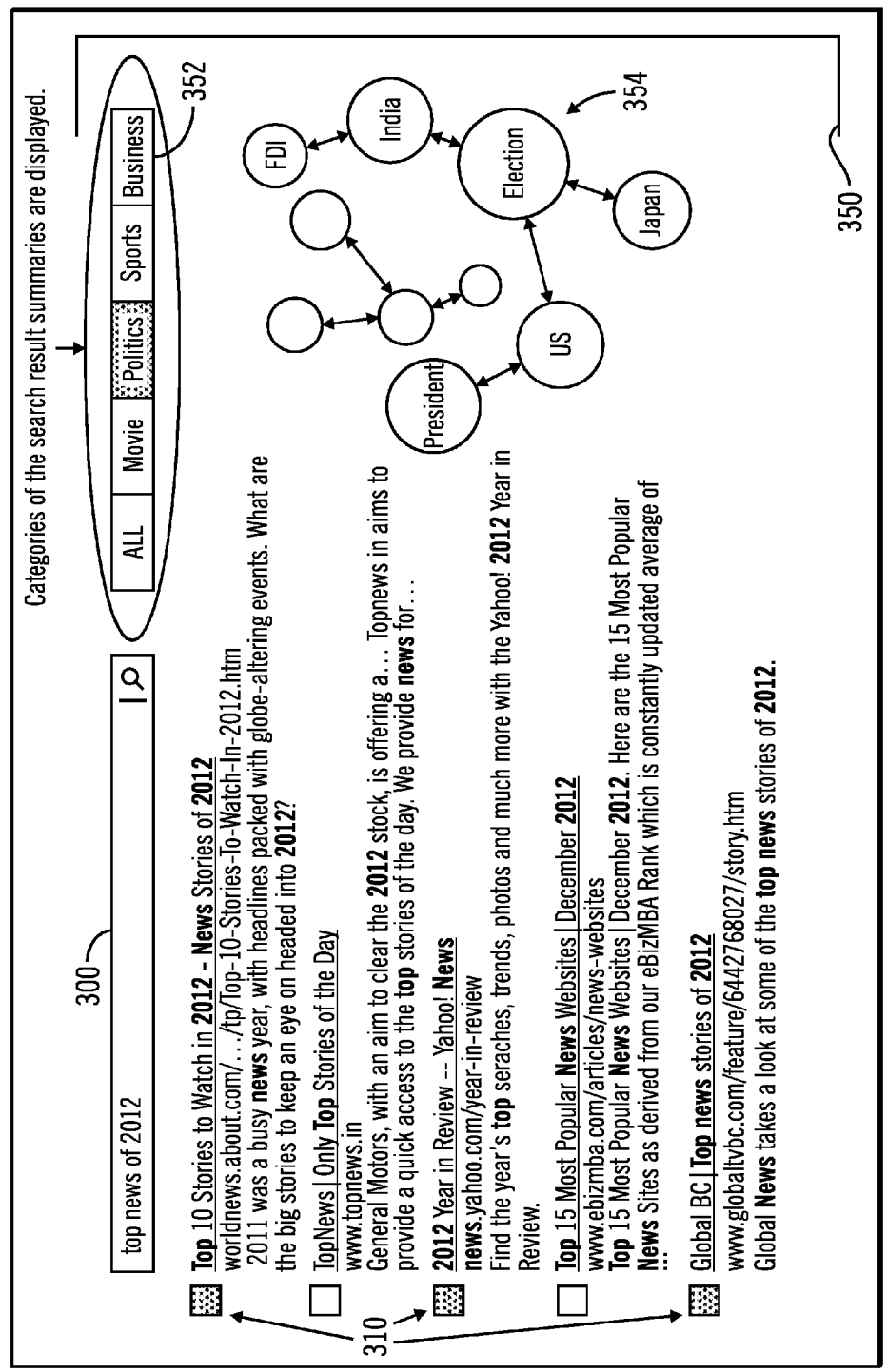
FIG. 3 illustrates an example of a search query and search results 300 in accordance with certain embodiments.

In block 212, the SRS engine 120 receives selection of one or more graphical elements in the displayed graphical view. In block 214, the SRS engine 120 provides further details for the selected one or more graphical elements. In certain embodiments, the graphical element is a displayed entry or a displayed category. In certain embodiments, the graphical view presents categories (e.g., the categories of content, such as shown in FIG. 3), and, in response to one or more categories being selected, the SRS engine 120 displays entries and relationship bonds for the selected one or more categories. In certain embodiments, the entries and relationship bonds are displayed in a directed graph. In certain embodiments, in response to one or more entries in the directed graph being selected, the SRS engine 120 displays a new search results summary that combines each search result summary associated with the selected one or more entries (e.g., from which keywords are obtained).

In certain embodiments, based on a search query, the search engine 110 returns multiple search results, and a user may select two or more search results. The SRS engine 120 generates and displays a combined search results summary for the selected search results. The combined search results summary is displayed in a graphical view. In certain embodiments, the SRS engine 120 extracts keywords from each of the URLs for the selected search results and shows keyword relationships. Then, a user is given the option to view a category level search results summary of different, selected search results.

In certain embodiments, a search result for a document may be described by a URL that is a function of keywords in that document, such as in the following:

URL 1=f (Keyword 1, Keyword 2, Keyword 3, Keyword 4)
URL 2=f (Keyword 2, Keyword 5, Keyword 3, Keyword 7)
URL 3=f (Keyword 4, Keyword 7, Keyword 1, Keyword 2)
URL 4=f (Keyword 7, Keyword 8, Keyword 1, Keyword 2)

The SRS engine 120 is able to extract the keywords from the documents, from the URL, from the search summaries associated with the URL, etc. Then, in certain embodiments, based on association rules and clustering mining models, the SRS engine 120 finds relationships among the keywords. Association rules may be described as rules for discovering interesting relations between keywords using different measures of interestingness. Clustering mining models may be used to group keywords so that the keywords in the same group (cluster) are more similar to each other than to keywords in other groups (clusters).

The relationship bonds among the keywords may vary from keyword to keyword. For example, the keyword strengths may be described with the following relationship rules:

Strongest Bond (between 2 keywords): If the 2 keywords are present in same sentence.
Lesser strength bond than 1 (between 2 keywords): If the 2 keywords are present within ⅔ sentences.
Lesser strength bond than 2 (between 2 keywords): If the 2 keywords are present within ⅘ sentences or within a paragraph.
Lesser strength bond than 3 (between 2 keywords): If the 2 keywords are present within the same document.

Based on such relationship rules, the SRS engine 120 identifies the strengths between keywords. Moreover, in certain embodiments, association rule or dependency network techniques may be used to determine the relationship strengths.

In certain embodiments, ontology may be used for grouping the keywords into categories. Based on the selection of a category, the SRS engine 120 displays appropriate keywords and relationship bonds.

FIG. 3 illustrates an example of combined search results summary in accordance with certain embodiments. For example, in FIG. 3, for search query 300, there are five search results with search result summaries. The search results are displayed with check boxes. Three of the search results have been selected by selecting check boxes 310 associated with those search results. In other embodiments, graphical elements other than check boxes may be used for selection of the search results.

Also, in FIG. 3, a graphical view 350 is displayed for a combined search results summary. The graphical view 350 includes a set of categories 352 and a directed graph 354 illustrating relationships between keywords. The categories shown (in the set of categories 352) and the keywords shown in circles (in the directed graph 354) are graphical elements that may be selected to obtain further details. In this example, the size of a circle is based on a weight of the keyword stored in that circle. In the example of FIG. 3, the user has selected the graphical element "Politics" category, then the SRS engine 120 displays the directed graph 354 with a set of keywords and the relationship bonds among the keywords that describe the "Politics" category. This results in displaying the context with a set of keywords.

In certain embodiments, the combined search results summary displays social recommendations, recent trending topics, etc. along with or as part of the graphical view.

Figure 4:
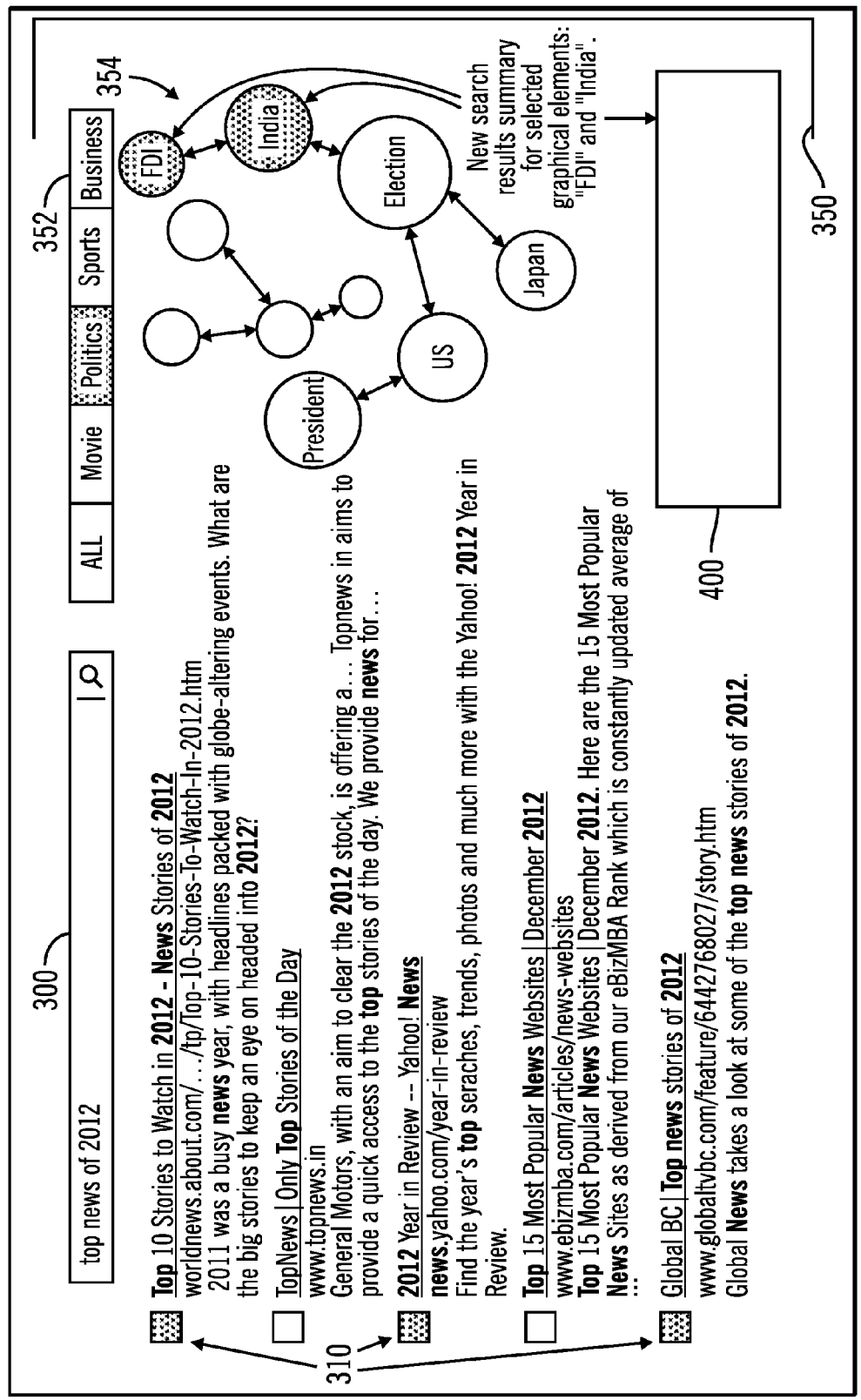
FIG. 4 illustrates a new search results summary displayed in response to selection of a graphical element in accordance with certain embodiments.

FIG. 4 illustrates a new search results summary 400 displayed in response to selection of a graphical element in accordance with certain embodiments. When the graphical element keyword is selected in the directed graph 354, the SRS engine 120 displays a new search results summary in box 400.

For example, in the directed graph 354, keyword "India" is related to keyword "FDI", and keyword "India" is related to keyword "Election". In the example of FIG. 4, the graphical elements "FDI" and "India" have been selected, and the SRS engine 120 displays a new search results summary 400 for the selected keywords of "FDI" and "India".

As a further example, a user may select the keywords "FDI", "India", and "Election", and the SRS engine 120 would display a new search results summary 400 for the selected keywords of "FDI, "India", and "Election".

The new search results summary is based on the originally selected search results. For example, based on the selection of a search result (e.g., in the form of a URL), keywords are extracted from the selected URL and used to identify keywords from the page associated with the URL. Then, the new search results summary may be created using the extracted keywords and the identified keywords. In certain embodiments, the relationships between the keywords may also be displayed as part of the new search results summary.

Figure 5:
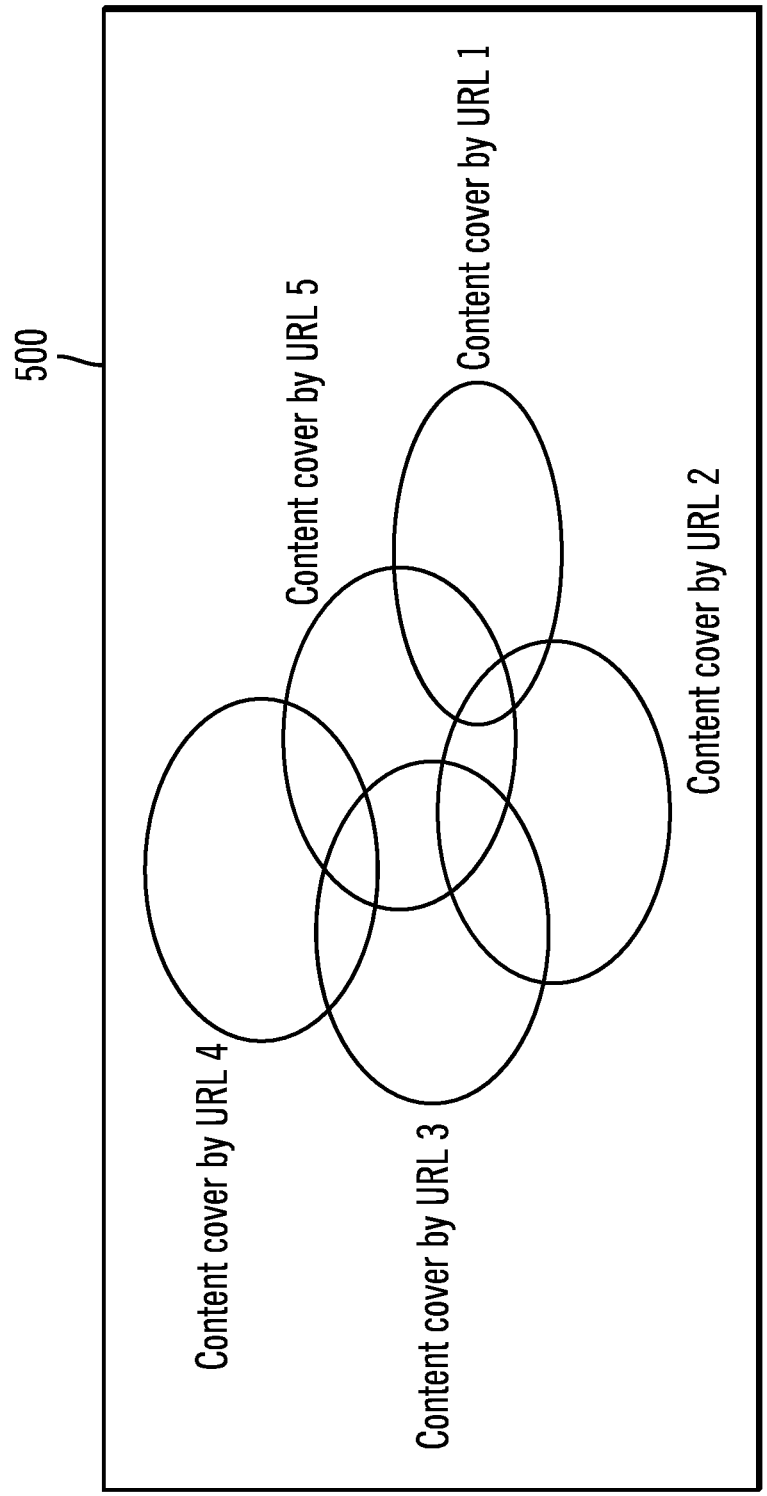
FIG. 5 illustrates, using circles that overlap, common and different content for five search results in accordance with certain embodiments.

FIG. 5 illustrates, using circles that overlap, common and different content 500 for the five search results of FIG. 3 in accordance with certain embodiments. In particular, the overlapping portions represent common content, and the non-overlapping portions represent different (distinct) content.

Thus, embodiments display a synthesized aggregate of search results and a network of relationships.

The SRS engine 120 combines search result summaries by: receiving a search query; identifying at least two references for the search query; identifying relationships between keywords in the at least two references; and presenting the relationships with an indication of strength of the relationship. Moreover, responsive to a user selecting at least one relationship, searching and presented additional information according to the user selection.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flow diagram (e.g., flowchart) illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowcharts illustration, and combinations of blocks in the block diagrams and/or flowcharts illustration, can be implemented by special purpose hardware-based systems that perform the specified functions or acts, or combinations of special purpose hardware and computer instructions.

In addition, the illustrated operations of the flow diagrams and block diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Figure 6:
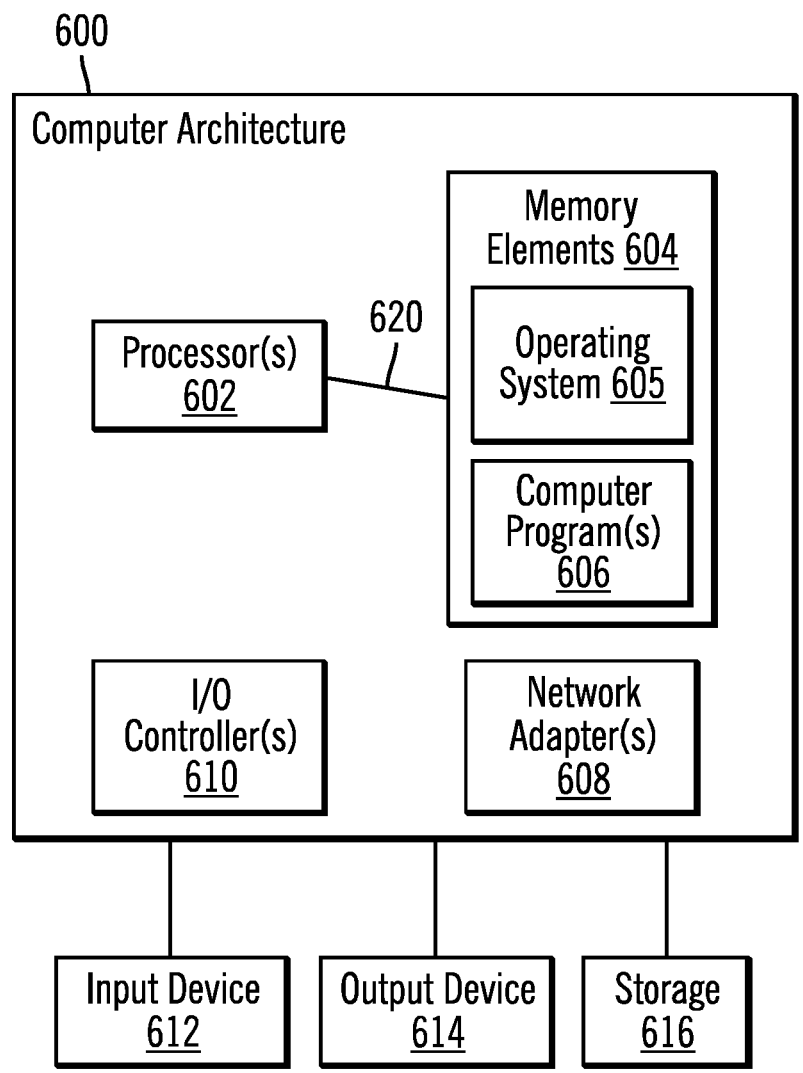
FIG. 6 illustrates, in a block diagram, a computer architecture that may be used in accordance with certain embodiments.

FIG. 6 illustrates a computer architecture 600 that may be used in accordance with certain embodiments. In certain embodiments, computing device 100 may implement computer architecture 600. The computer architecture 600 is suitable for storing and/or executing program code and includes at least one processor 602 coupled directly or indirectly to memory elements 604 through a system bus 620. The memory elements 604 may include local memory employed during actual execution of the program code, bulk storage, and cache memories which provide temporary storage of at least some program code in order to reduce the number of times code must be retrieved from bulk storage during execution. The memory elements 604 include an operating system 605 and one or more computer programs 606.

Input/Output (I/O) devices 612, 614 (including but not limited to keyboards, displays, pointing devices, etc.) may be coupled to the system either directly or through intervening I/O controllers 610.

Network adapters 608 may also be coupled to the system to enable the data processing system to become coupled to other data processing systems or remote printers or storage devices through intervening private or public networks. Modems, cable modem and Ethernet cards are just a few of the currently available types of network adapters 608.

The computer architecture 600 may be coupled to storage 616 (e.g., any type of storage device; a non-volatile storage area, such as magnetic disk drives, optical disk drives, a tape drive, etc.). The storage 616 may comprise an internal storage device or an attached or network accessible storage. Computer programs 606 in storage 616 may be loaded into the memory elements 604 and executed by a processor 602 in a manner known in the art.

The computer architecture 600 may include fewer components than illustrated, additional components not illustrated herein, or some combination of the components illustrated and additional components. The computer architecture 600 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

What is claimed is:

1. A computer program product, the computer program product comprising a computer readable storage medium having program code embodied therewith, the program code executable by at least one processor to perform:
   receiving selection of two or more search results, wherein each of the two or more search results has an associated search result summary;
   extracting keywords from the selected two or more search results and each associated search result summary;
   based on association rules and clustering mining models, identifying relationships between the keywords;
   based on relationship rules, identifying strengths of the relationships between the keywords; and
   displaying a graphical view that shows the keywords, the relationships, and the strengths of those relationships.

2. A computer system, comprising:
   one or more processors, one or more computer-readable memories and one or more computer-readable, tangible storage devices; and
   program instructions, stored on at least one of the one or more computer-readable, tangible storage devices for execution by at least one of the one or more processors via at least one of the one or more memories, to perform:
   receiving selection of two or more search results, wherein each of the two or more search results has an associated search result summary;
   extracting keywords from the selected two or more search results and each associated search result summary;
   based on association rules and clustering mining models, identifying relationships between the keywords;
   based on relationship rules, identifying strengths of the relationships between the keywords; and
   displaying a graphical view that shows the keywords, the relationships, and the strengths of those relationships.

3. The computer program product of claim 1, wherein each of the two or more search results is associated with a document.

4. The computer program product of claim 1, wherein the relationships are defined by at least one of the keywords, concepts, distinction, commonality, and time.

5. The computer program product of claim 1, wherein the graphical view includes a directed graph of the keywords of each associated search result summary and a set of categories.

6. The computer system of claim 2, wherein each of the two or more search results is associated with a document.

7. The computer system of claim 2, wherein the relationships are defined by at least one of the keywords, concepts, distinction, commonality, and time.

8. The computer system of claim 2, wherein the graphical view includes a directed graph of the keywords of each associated search result summary and a set of categories.

9. The computer program product of claim 5, further comprising:
   receiving selection of a keyword from the keywords in the directed graph; and
   displaying a new search results summary that combines each search result summary from which the keywords were obtained.

10. The computer program product of claim 5, further comprising:
    receiving selection of a category from the set of categories; and
    displaying keywords associated with the selected category and relationship bonds.

11. The computer system of claim 8, further comprising:
    receiving selection of an a keyword from the keywords in the directed graph; and
    displaying a new search results summary that combines each search result summary from which the keywords were obtained.

12. The computer system of claim 11, further comprising:
    receiving selection of a category from the set of categories; and
    displaying keywords associated with the selected category and relationship bonds.

* * * * *